AUTOMATIC GAIN CONTROL SYSTEM

Filed Sept. 14, 1959 4 Sheets-Sheet 1

INVENTOR.
GERALD A. KIOUS
BY Isidore Match
ATTORNEY

AUTOMATIC GAIN CONTROL SYSTEM

Filed Sept. 14, 1959

INVENTOR.
GERALD A. KIOUS
BY Isidore Match
ATTORNEY

Jan. 16, 1962 G. A. KIOUS 3,017,508

AUTOMATIC GAIN CONTROL SYSTEM

Filed Sept. 14, 1959 4 Sheets-Sheet 3

INVENTOR.
GERALD A. KIOUS

BY Isidore Match

ATTORNEY

Jan. 16, 1962

G. A. KIOUS 3,017,508

AUTOMATIC GAIN CONTROL SYSTEM

Filed Sept. 14, 1959

4 Sheets-Sheet 4

INVENTOR.
GERALD A. KIOUS
BY Isidore Match
ATTORNEY 3,017,508

AUTOMATIC GAIN CONTROL SYSTEM

Gerald A. Kious, Lynchburg, Va., assignor to General Electric Company, a corporation of New York Filed Sept. 14, 1959, Ser. No. 839,876
12 Claims. (Cl. 250—20)

Figure 1:
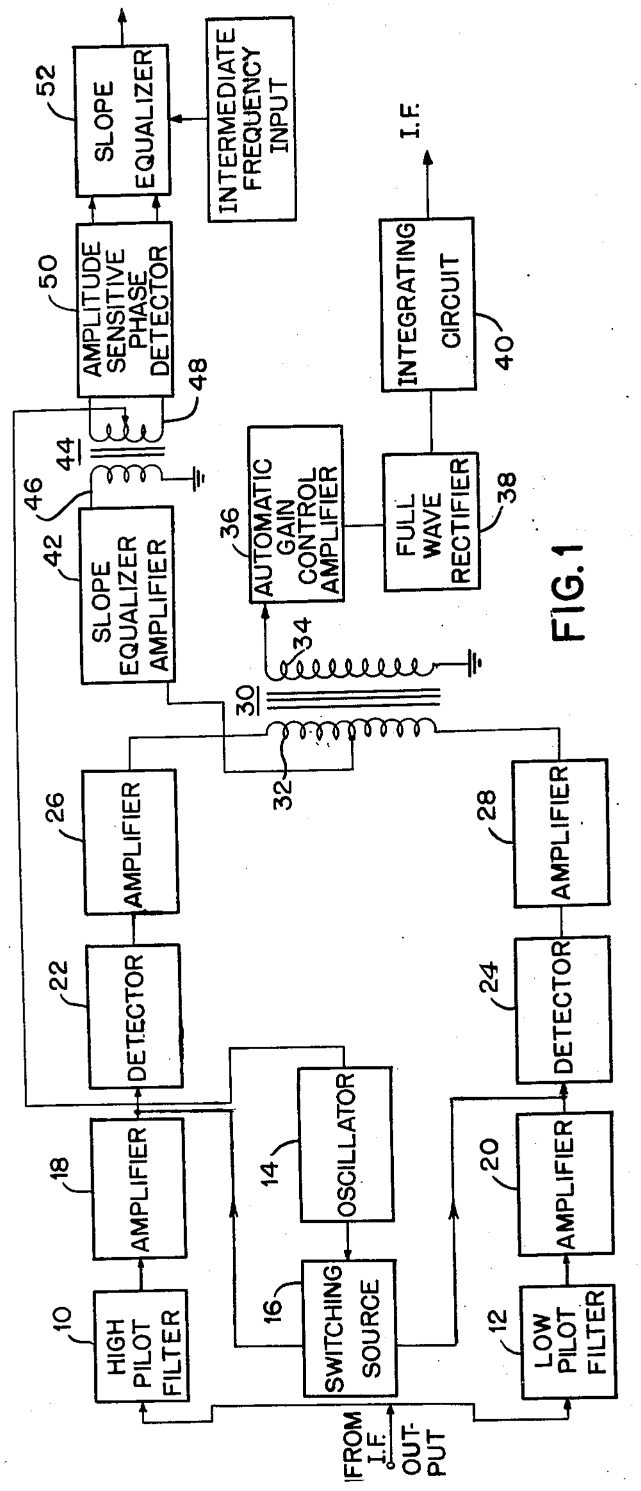

This invention relates to automatic gain control circuits. More particularly, it relates to a circuit for providing automatic slope equalization control using pilot signals transmitted to the receiver.

In the reception of single side band signals in which the carrier has been suppressed, it is necessary to reinsert the carrier at the receiver prior to detection of the modulating intelligence. In order for the modulating intelligence to be relatively faithfully reproduced, it is generally necessary that the reinserted carrier be within a few cycles of the correct value. At relatively low carrier frequencies, the necessary accuracy can be obtained by the use of stable crystal oscillators at the transmitter and the receiver. At higher transmission frequencies, however, it has been found that crystal oscillators, by themselves, will not maintain their frequency with sufficient accuracy over long times under working conditions. It is then necessary to transmit a pilot signal to the receiver for the purpose of indicating at the receiving point the correct frequency to be reinserted. This pilot signal can be transmitted as a carrier of a reduced amplitude or some other frequency related to the original transmitted carrier.

Generally a receiver for a single side band system is gain controlled by selecting the transmitted pilot signal at the receiver and thereafter maintaining the pilot signal at a substantially constant amplitude level. In this type system, the pilot signal is amplified and detected to produce a control voltage which is compared against a fixed reference voltage and the difference between the two voltages is then utilized to control the gain of the intermediate frequency amplifier in the receiver. Such arrangement for producing the gain control voltage presents the disadvantage that the output of the receiver is not held constant at the intermediate frequency output but at the location of the voltage reference point. Any amplifiers or other devices between this reference point and the intermediate frequency output accordingly must be extremely stable in gain since any change in the gain characteristics thereof produces a corresponding change in the intermediate frequency output.

If a receiver is utilized in a single side band system for receiving signals that experience selective fading, it is necessary to provide an arrangement for correcting any resulting slope in the output signal. This, heretofore, has been usually accomplished by utilizing two pilot signals, one at either end of the frequency band being transmitted and utilizing the voltage level between them to control a slope equalizing device. This is accomplished by converting the two pilot signals to respective direct current voltages proportional thereto and obtaining the difference there between to control the slope equalizer. For such system to operate, each of these direct current voltages have to be compared with respective equal reference voltages, respective differences between the direct current voltages derived from the pilot signals and the reference voltages have to be amplified and such amplified differences are then utilized to control the slope equalizer. The gain of the two pilot signal amplifier systems must be the same at all levels of signal and the two reference voltages must be identical.

When two or more receivers are utilized in diversity reception in a single side band system, the output of the receiver has to be held constant practically down to a zero db signal to noise ratio.

It is, accordingly, an object of this invention to provide an improved automatic gain control circuit.

It is another object to provide an automatic gain control circuit in a receiver wherein a received pilot signal is utilized and wherein the output of the automatic gain control circuit is always the same independent of the signal to noise ratio of the received pilot signal whereby the output controlled by such automatic gain control circuit is held substantially constant down to a zero db signal to noise ratio of pilot signal.

It is still another object to provide an automatic gain control system in a receiver where two received pilot signals are utilized wherein respective gain variations in separate pilot signal amplifier systems have substantially no effect upon the output level of the automatic gain control circuit.

It is yet another object to provide an automatic gain control circuit as in the preceding object wherein there is utilized a slope equalizer to maintain both pilot signals at an equal level and wherein a voltage is provided for automatically controlling such slope equalizer which is independent of that used for automatic gain control, such slope equalizer control voltage also being independent of the direct current voltage utilized as the reference in obtaining the automatic gain control voltage.

Generally speaking, and in accordance with this invention, there is provided in a receiver wherein the received wave includes a low and a high pilot signal having the frequencies of the lower and upper end frequencies of a chosen received band, means for automatically controlling the gain of the receiver. This automatic gain control means comprises means for selecting from the received signal the low pilot signal and means for selecting from the received signal, the high pilot signal. Means are provided for chopping the selected pilot signals with a wave having a frequency substantially lower than the pilot signals. Means are provided for combining the chopped pilot signals and for deriving from such combined signals a voltage which is proportional to the average, i.e. root means square, of the voltage of the combined pilot signals.

Also, there is provided in accordance with this invention in a receiver wherein the received wave includes a low and a high pilot signal having respectively the frequencies of lower and upper end frequencies of a chosen band, means for automatically controlling the gain of the receiver comprising a means for selecting the low pilot signal from the received wave and means for selecting the high pilot signal from the received wave. Means are provided for chopping the pilot signals with a wave having a frequency substantially lower than that of the pilot signals and means are provided for combining such modulated pilot signals in additive relation. A reference unidirectional voltage is derived from the combination of the pilot signals which is proportional to an average, i.e., such as the root means square of the voltage of the combined pilot signals which is utilized as the automatic gain control voltage for controlling the output of an appropriate stage in the receiver such as the final stage of an intermediate frequency amplifier. There is also provided means for combining the pilot signals in subtractive relation and for comparing the voltage of the signal resulting from such combination with the output from said chopping means to derive a pair of unidirectional voltages equal in amplitude and opposite in polarity which are utilized as control voltages for automatically controlling a slope equalizer.

The features of this invention, which are believed to be new, are set forth with particularity in the appended claims. The invention itself, however, may best be understood by reference to the following description when taken in conjunction with the accompanying drawings which show an embodiment of the gain control system according to the invention.

Figure 5:
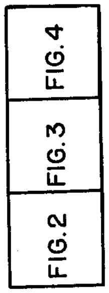
Figure 2:
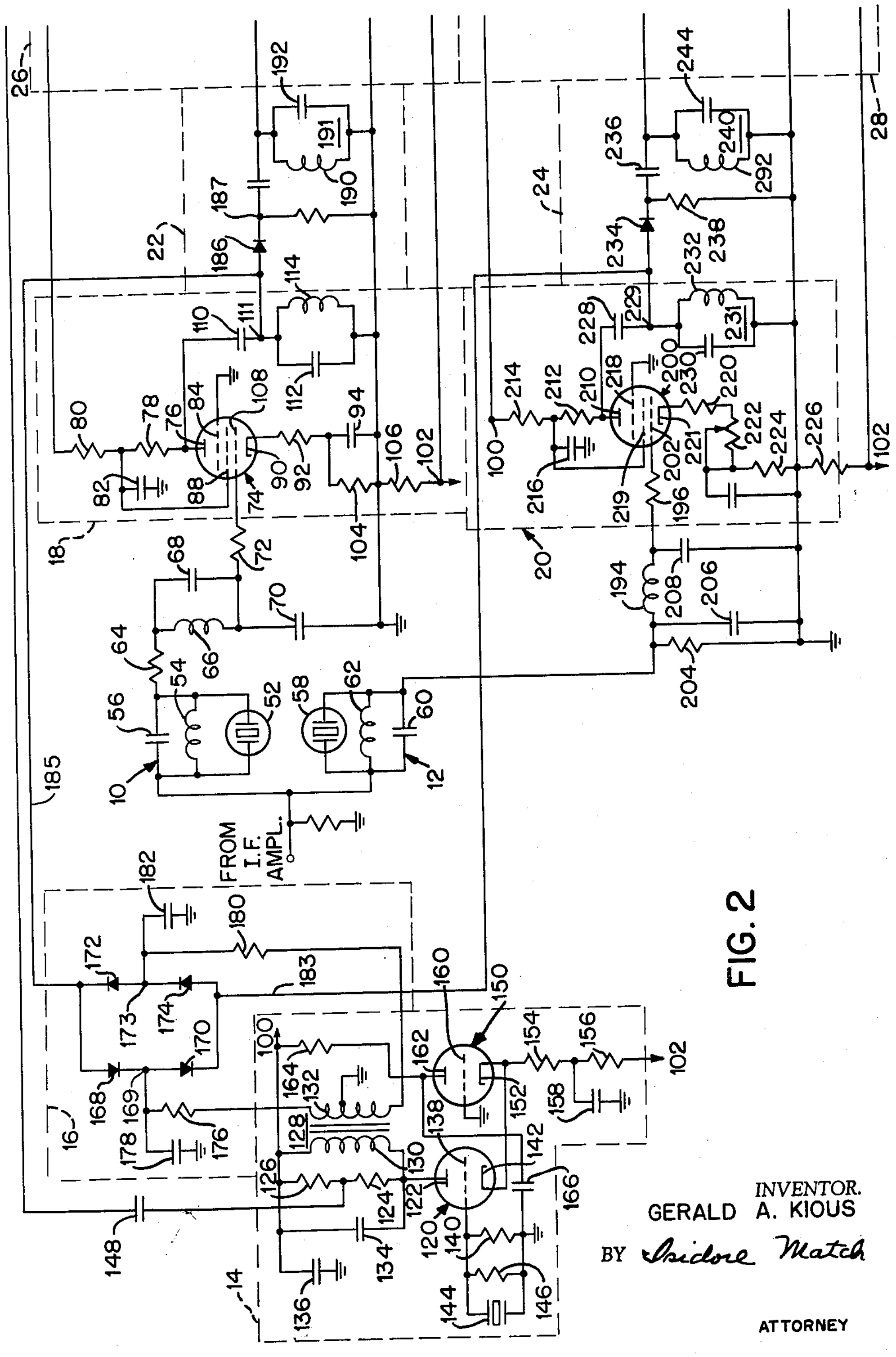
Figure 3:
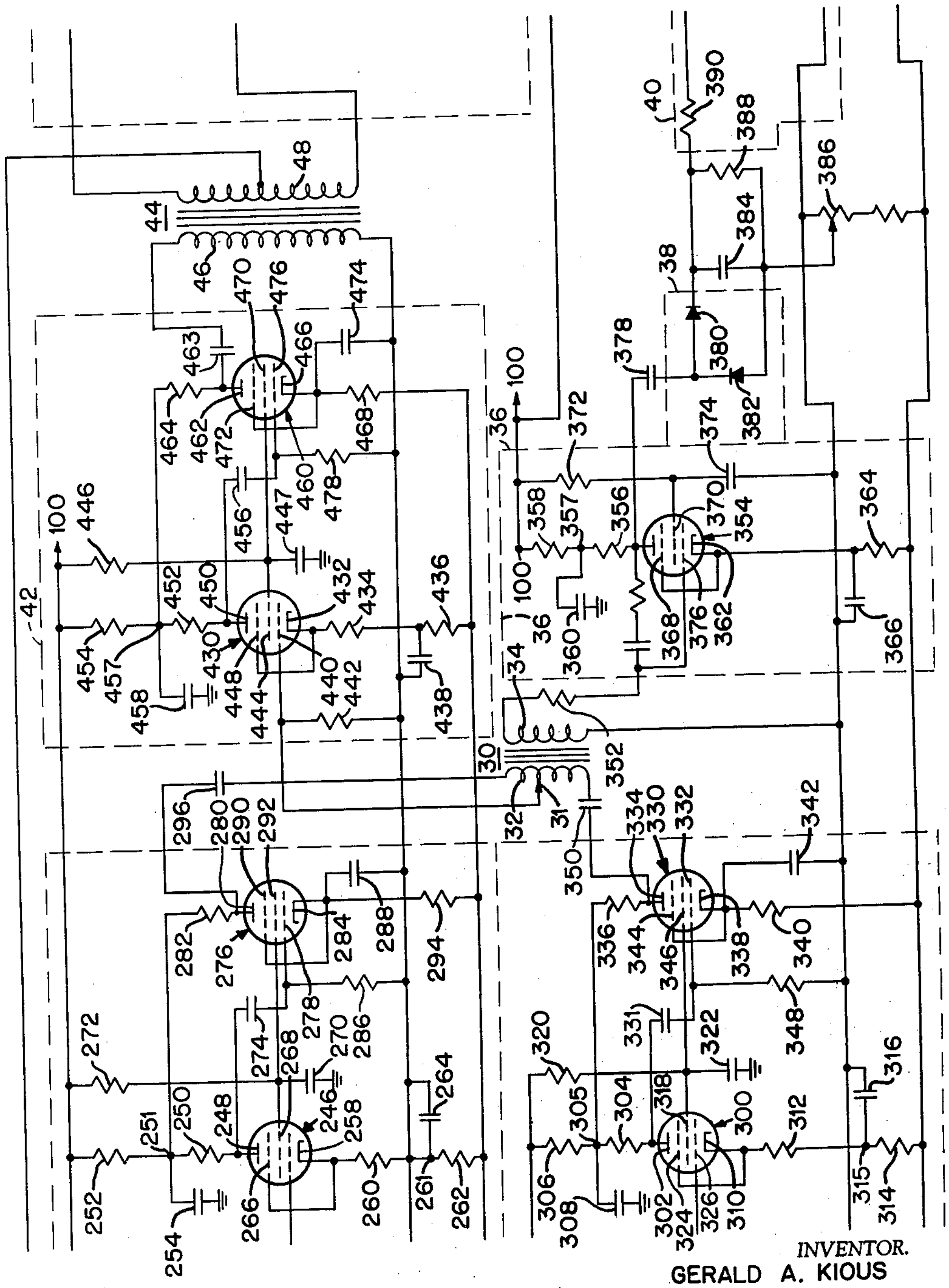
Figure 4:
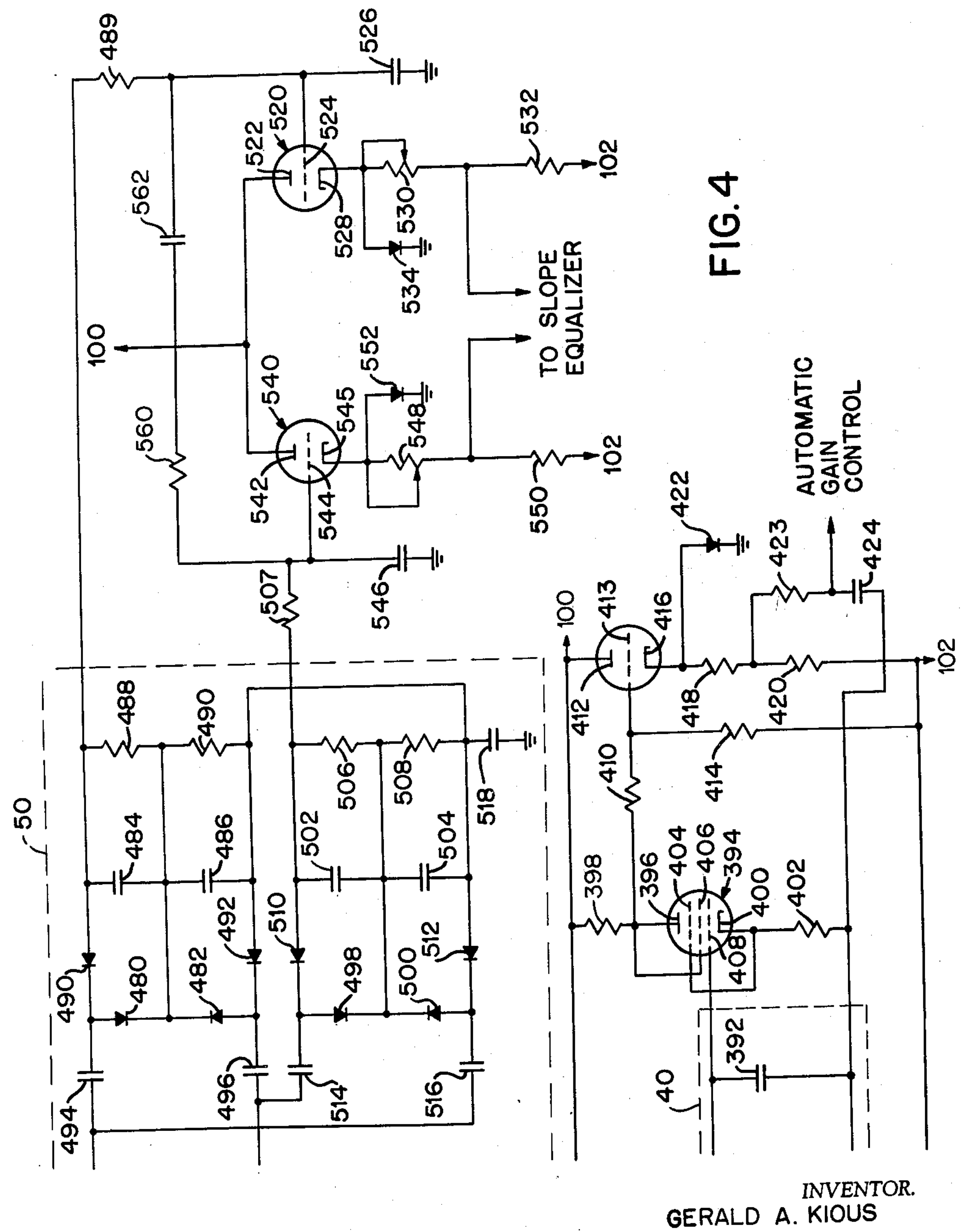

In the drawings, FIG. 1 is a block diagram of a system in accordance with the principles of the invention; and FIGS. 2, 3, and 4 taken together as in FIG. 5 is a partially schematic depiction of the system depicted in block diagram in FIG. 1.

Referring now to FIG. 1, the signal from the output of the intermediate frequency amplifier in a single side band reception system containing both the modulating intelligence and high and low pilot signals is simultaneously applied to a high pilot filter 10 and a low pilot filter 12. Filters 10 and 12 are preferably relatively narrow band pass high "Q" crystal filters, the center frequency of the respective bands being the same as the frequency of the high and low pilot signals. The high pilot signal preferably has the frequency of the upper end of the band being received and the low pilot signal has the frequency of the lower end of the band being received. For example, if the base band width which is being received is from 16.00 to 16.120 mc., it is desired to select at the output of high pilot filter 10, a signal having a frequency of 16.120 mc. and at the output of low pilot filter 12, a signal having a frequency of 16.00 mc. Feedback stabilized amplifier 18 and a similar amplifier 20 moderately raise the level of the respective pilot signals and provide necessary impedance matching. An oscillator 14 which may suitably be a generator of a sinusoidal wave having a frequency which is substantially lower than that of the pilot signals, say about 150 kc., where the pilot signals have the frequencies as outlined above, is applied to a switching source 16 whereby alternate half cycles of waves from oscillator 14 are mixed with the output of high pilot amplifier 18 and low pilot amplifier 20 respectively. With this arrangement, at the junction of the output of high pilot amplifier 18 and switching source 16 and at the junctions of low pilot amplifier 20 and switching source 16 there are obtained half cycle samplings at the frequency of oscillator 14 of the respective pilot signals which are 180° out of phase with each other.

The pilot signals, chopped at the frequency of oscillator 14, are now applied to detectors 22 and 24 respectively. Detectors 22 and 24 are generally chosen so that their operating characteristics are essentially square law at the level of the output from preceding amplifier stages 18 and 20. The outputs of detectors 22 and 24 are respectively applied to like amplifiers 26 and 28, the respective inputs to amplifiers 26 and 28 being preferably developed across a resonant circuit tuned to the frequency of oscillator 14 whereby the outputs of detectors 22 and 24 are smoothed to a sinusoidal form. The output of amplifier 26 is applied to the upper terminal of the primary winding 32 of a transformer 30 and the output of amplifier 28 is applied to the lower terminal of primary winding 32. The voltage appearing at the upper terminal of the secondary winding 34 of transformer 30 is applied as an input to an automatic gain control amplifier 36 the lower terminal of secondary winding 34 being connected to ground.

It is to be noted that the voltage applied to amplifier 36 from secondary winding 34 is the difference between the voltage outputs of amplifiers 26 and 28 respectively and thus, if these amplifier outputs are equal, such difference voltage is twice the value of one amplifier output since the respective voltages are 180° out of phase with respect to each other.

The output of amplifier 36 is now passed through a full wave rectifier 38 and the output of rectifier 38 is combined with a suitable automatic gain control reference voltage. Such combined automatic gain control and reference voltage is now applied to an integrating circuit one preferably having a long time constant RC circuit which effectively provides a unidirectional voltage whose level is proportional to the root mean square level of the original pilot signals. The output of integrating circuit 40 may be utilized as the automatic gain control voltage and is suitably applied to the intermediate frequency amplifier of the receiver.

From the foregoing, it readily can be appreciated that in the automatic gain control circuit, in accordance with the invention, most of the gain is obtained at the frequency of oscillator 14 since both pilots are chopped prior to amplification and the gain of amplifier 36 is common to both pilot signals since they are combined before they are amplified therein. Gain variations therefore can be minimized by using highly stable feedback amplifiers. Also, since root mean square detection is utilized, i.e., by means of square law detectors 22 and 24 and integrating circuit 40, the automatic gain control voltage to be applied to the intermediate frequency amplifier is substantially the same no matter what the signal-to-noise ratio of the selected pilot signals. Thus, the intermediate frequency output can be held constant even down to a zero decibel signal to noise ratio of the pilot signals. It is further to be noted that only a single reference voltage is required.

With reference to the slope equalizer phase of the invention the voltage appearing at the mid-point of primary winding 32 of transformer 30 is applied to an amplifier 42, the voltage appearing at the mid-point of the primary winding 32 being the sum of the outputs of amplifiers 26 and 28 and accordingly is zero when both of these outputs are equal since the latter are 180° out of phase with respect to each other. The output of amplifier 42 is applied to the upper terminal of the primary winding 46 of the transformer 44, the lower terminal of primary winding 46 being connected to ground. The voltage appearing across secondary winding 48 of transformer 44 is applied as one input to an amplitude sensitive phase detector 50, the other input to phase detector 50 being an output from oscillator 14 which is applied as an input to the mid-point of secondary winding 48. Phase detector 50 is suitably chosen to be a circuit which provides two substantially unidirectional voltage outputs which are equal but of opposite polarity. The comparison between the signal from oscillator 14 and the combined chopped pilot signals having the frequency of oscillator 14 as applied from the mid-point of primary winding 32 in phase detector 50 results in unidirectional voltages whose polarities depend upon which pilot signal amplitude is greater and whose levels depend upon the amount of difference in amplitude between the two pilot signals. The separate outputs from phase detector 50 can now be applied as the respective necessary control inputs to a slope equalizer 52. Slope equalizer 52 may be of the conventional type, well known in the art.

It is thus seen that, in this invention, the gain required for the slope equalizer control is independent of that used for the automatic gain control and is obtained at the frequency of oscillator 14. The slope equalizer control voltages are also independent of the reference voltage which is established to provide the automatic gain control voltage.

Referring now to FIGS. 2, 3, and 4 wherein there is shown a schematic depiction of the system shown in block form in FIG. 1, the output from the intermediate frequency stage is applied to high pilot filter 10 and low pilot filter 12. High pilot filter 10 comprises a narrow band pass high "Q" filter having a center frequency equal to the frequency of the high pilot signal to be selected from the output on the intermediate frequency amplifier. Filter 10 includes a crystal 52 such as an AT cut quartz crystal shunted by parallel arrangement of an inductor 54 and a capacitor 56. Low pilot filter 12 is also a narrow band pass high "Q" filter and has a center frequency equal to the frequency of the low pilot signal to be selected from the output of the intermediate frequency amplifier. Low pilot filter also comprises a crystal 58 such as an AT cut quartz crystal shunted by a parallel arrangement of a capacitor 60 and an inductor 62.

The output of high pilot filter 10 is applied as an input to amplifier 18 through a resistor 64, a frequency trimmer comprising an inductor 66 and a capacitor 68 in parallel connection, the trimmer network being completed by capacitor 70 to ground. Amplifier 18 comprises a pentode vacuum tube 74 which includes a plate 76 connected through a voltage divider comprising a resistor 78 and a resistor 80 to a positive potential source 100, the junction of resistors 78 and 80 being grounded through a capacitor 82, a grounded suppressor grid 84, a screen grid 88 grounded through capacitor 82 and connected to source 100 through resistor 80, a cathode 90 connected to ground through a resistor 92 and a capacitor 94, the junction of resistor 92 and capacitor 94 being connected to a source of negative potential 102 through a series arrangement of a resistor 104 and a resistor 106. The output of filter 10 is applied as an input to a control grid 108 through resistor 72, the output appearing at plate 76 being developed across a series arrangement of a capacitor 110 and a parallel circuit comprising a capacitor 112 and an inductor 114.

The low pilot signal selected at the output of low pilot filter 12 is applied to the input of amplifier 20 through series connected inductor 194 and resistor 196. Amplifier 20 comprises a pentode vacuum tube 200 having a control grid which is returned to ground through series connected resistor 196 and an inductor 194 and a parallel connected resistor 204, resistor 204 being shunted by a capacitor 206 and a capacitor 208, inductor 194 being connected between the upper terminals of capacitors, 206 and 208. The plate 210 of tube 200 is connected to source 100 through a voltage divider arrangement comprising resistors 212 and 214, the junction of resistors 212 and 214 being grounded through a capacitor 216. The suppressor grid 218 is connected to ground and the screen grid 219 is connected to the junction of resistors 212 and 214. The cathode 221 is connected to the negative potential source 102 through a resistor 220, a potentiometer 222, resistor 224 and resistor 226, potentiometer 222 serving to fix the automatic gain control level balance. The output of plate 210 is applied through a capacitor 228 and developed across a tuned circuit 231 tuned to the frequency of the low pilot signal and comprising a parallel arrangement of a capacitor 230 and an inductor 232.

As has been explained hereinabove in connection with the description of the block diagram FIG. 1, the pilot signals selected from the intermediate frequency output have respective frequencies which are appreciably higher than the frequency of the output of oscillator 14, say by a factor of 100.

Oscillator 14 comprises a first vacuum tube 120 comprising a plate 122 connected to potential source 100 through resistors 124 and 126, plate 122 also being connected to source 100 through the primary winding 130 of a transformer 128, shunted by a tuning capacitor 134 and grounded through a capacitor 136. Control grid 138 of tube 120 is returned to ground through a resistor 140. The cathode 142 is connected in common with the cathode 152 of tube 150 to negative potential source 102 through a voltage divider comprising resistors 154 and 156 being grounded through a capacitor 158. The control grid 160 of tube 150 is grounded and the plate 162 is connected to source 100 through a resistor 164. The output appearing at plate 162 is applied to grid 138 through a capacitor 166 and a crystal 144 having a resonant frequency of the desired output frequency of oscillator 14, crystal 144 being shunted by a resistor 146. The secondary winding 132 of transformer 128 is grounded at its mid-point and the voltage appearing at its upper and lower terminals are applied as inputs to switching source 16.

Switching source 16 comprises diodes 168 and 170 poled in one direction and diodes 172 and 174 poled in the opposite direction, the output appearing at the upper terminal of secondary winding 132 being applied through a resistor 176 to the junction 169 of diodes 168 and 170, junction 169 being grounded through a capacitor 178 and the output appearing at the lower terminal of secondary winding 132 being applied through a resistor 180 to the junction 173 of diodes 172 and 174, junction 173 being grounded through a capacitor 182. It is seen that conductor 183 is grounded through forward biased diodes 170 and 174 and capacitors 178 and 182 respectively when the voltage at junction 173 is negative and the voltage at junction 169 is positive and that conductor 185 is grounded through forward biased diodes 168 and 172 and capacitors 178 and 182 respectively when the voltage at junction 173 is positive and the voltage at junction 169 is negative. Thus, alternate half cycles of voltage from oscillator 14 appear on conductor 185 and are applied thereby to the junction 111 of capacitor 110 and the parallel arrangement of capacitor 112 and inductor 114, the latter being a tuned circuit tuned to the frequency of the high pilot signal, and at junction 229 of capacitor 228 and the parallel arrangement of capacitor 112 and inductor 232, the latter being a tuned circuit to the frequency of the low pilot signal. With this arrangement, the outputs of amplifiers 18 and 20 at junctions 111 and 129 consist of alternate bursts of high and low pilot signals respectively at the frequency of oscillator 14. This chopped high pilot signal is passed through a rectifier 186, the latter comprising a diode having an anode connected to junction 111 and a cathode connected to one end of resistor 188, the other end of resistor 188 being connected to ground. Rectifier 186 may suitably be a rectifier of the semi-conductor type and having an operating characteristic such that at the level of the output from plate 76 of amplifier 18, its operation is essentially square law.

The rectified voltage appearing at junction point 187 is applied through a capacitor 188 and developed across a tuned circuit 191 tuned to the frequency of the output of oscillator 14, tuned circuit 191 comprising a parallel arrangement of an inductor 190 and a capacitor 192, to the input of amplifier 26.

Thus, bursts of low pilot signal occurring at the junction 229 of capacitor 228 and circuit 231 at the frequency of oscillator 14, are passed through a rectifier 234 and a capacitor 236 to the input of amplifier 28. Rectifier 234 suitably comprises a semi-conductor diode having an anode connected to junction 229 and its cathode connected to capacitor 236, a resistor 238 being connected between the junction of the cathode of rectifier 234 and capacitor 236 and ground. The voltage applied to amplifier 28 is developed across a parallel circuit 240 of an inductor 242 and a capacitor 244, circuit 240 having a resonant frequency at the frequency of oscillator 14. The function of circuits 191 and 240 is to smooth the output from rectifiers 186 and 234 to sinusoidal waves.

At this point it is to be observed that the respective inputs to amplifiers 26 and 28 are samplings of the high and low pilot signals at the frequency of oscillator 14, such sampling being 180° out of phase with each other due to the push-pull action of switching source 16.

Amplifiers 26 and 28 are similar in structure, each comprising two amplifier stages in cascade arrangement. Amplifier 26 comprises a pentode vacuum tube 246 and a pentode vacuum tube 276. Tube 246 includes a plate 248 connected to source 100 through a voltage divider arrangement comprising resistors 250 and 252, the junction 251 of resistors 250 and 252 being grounded through a capacitor 254. The cathode 258 of tube 246 is connected to negative potential source 102 through resistors 260 and 262, the junction 261 therebetween being grounded through a capacitor 264. The suppressor grid 266 is connected to cathode 258 and the screen grid 268 is grounded through a capacitor 270 and connected to positive potential source 100 through a resistor 272. The output at plate 248 is applied through a capacitor 274 to the control grid 278 of tube 276.

The plate 280 of tube 276 is connected to junction 251 through resistor 282, the cathode 284 is connected to negative potential source 102 through a resistor 294 bypassed to ground by a capacitor 288, the suppressor grid 290 is tied to cathode 284 and the screen grid 292 is connected to screen grid 268 of tube 246. Control grid 278 is returned to ground through a resistor 286 and the output at plate 280 is applied to the upper terminal of primary winding 32 of transformer 30 through a capacitor 296.

Amplifier 28 comprises a pentode vacuum tube 300 and a pentode vacuum tube 330. Tube 300 includes a plate 302 connected through a voltage divider comprising a resistor 304 and a resistor 306, the junction point 305 therebetween being grounded through a capacitor 308, a cathode 310 connected to negative potential source 102 through a voltage divider comprising a resistor 312 and a resistor 314, the junction 315 therebetween being grounded through a capacitor 316, a screen grid 318 connected to positive potential source 100 through a resistor 320 and grounded through a capacitor 322, a suppressor grid 324 connected to cathode 310, and a control grid 326 to which the input is applied. The output of tube 300 is applied to the control grid 332 of tube 330 through a capacitor 331. Tube 330 comprises a plate 334 connected through a resistor 336 to junction point 305, a cathode 338 connected to the negative potential source 102 through a resistor 340, resistor 340 being bypassed to ground by a capacitor 342, a suppressor grid 344 tied to cathode 338 and a screen grid 346 connected to screen grid 318 of tube 300. Control grid 332 is returned to ground through a resistor 348. The voltage appearing at plate 334 is applied to the lower terminal of the primary winding 32 through a capacitor 350. The voltage appearing at the mid-point 31 of primary winding 32 is applied to an amplifier 42.

It is comprehended that the voltage appearing at the mid-point 31 of primary winding 32 is the sum of two waves having the frequency of the output of oscillator 14. Since these waves are 180° out of phase with respect to each other due to the push-pull action of switching source 16, if the amplitude of the pilot signals are equal, the sum of the voltages at mid-point 31 is zero. As will be further explained hereinbelow, the voltage appearing at mid-point 31 is utilized in providing the slope equalizer control voltages.

The secondary winding 34 of transformer 30 has its lower terminal connected to ground and the voltage which appears at its upper terminal due to transformer action is the difference between the two voltages at oscillator 14 frequency and, if the pilot signals are equal, will be twice the value of one since the voltages are 180° out of phase with respect to each other.

The voltage appearing at the upper terminal of secondary winding 34 is applied to an amplifier 36 which can now conveniently be designated as an automatic gain control amplifier through a resistor 352. Amplifier 36 comprises a pentode vacuum tube 354 which includes a plate 356 connected to positive potential source 100 through a voltage divider arrangement comprising resistors 356 and 358, the junction 357 therebetween being grounded through a capacitor 360, a cathode 362 connected to a negative potential source 102 through a resistor 364, cathode 362 also being connected to ground through a capacitor 360, a suppressor grid 368 connected to cathode 362, a screen grid 370 connected to positive potential source 100 through a resistor 372 and grounded through a capacitor 374 and a control grid 376 to which the input to amplifier 36 is applied. The output appearing at plate 356 is applied through a capacitor 378 to a full wave rectifier comprising a diode 380 and a diode 382 poled as shown, diodes 380 and 382 conveniently being of the semiconductor type. The rectified output of the full wave rectifier is applied across a parallel arrangement of a capacitor 384 and a resistor 388. The values of capacitor 384 and 388 are so chosen whereby their time constant is long with respect to the frequency of oscillator 14. The setting of the tap on resistor 386 serves to provide an automatic gain control reference voltage which is a chosen fraction of the output from amplifier 36.

The reference voltage now is applied through an integrating circuit comprising series connected resistor 390 and parallel connected capacitor 392 to the input of an automatic gain control amplifier. The integrating circuit follows the propagation phase but does not follow the noise variations and the integration is done at the average of the radio frequency level and at the average of the noise level. With this arrangement, there is effectively provided a root mean square detection of the combined chopped pilot signals and thus the output of the automatic gain control circuit will be the same no matter what the signal to noise ratio of the pilot signal. Thus, there will be enabled the holding of the intermediate frequency output constant down to a zero db signal to noise ratio of pilot signal. The reference voltage which is provided, by means of a variable tap on resistor 386 is a single reference voltage. It is particularly to be noted that all amplification gain is obtained at the frequency of oscillator 14.

The amplifier to which the voltage across capacitor 392 is applied comprises a tube 394 having a plate 396 connected to positive potential source 100 through a resistor 402, a suppressor grid 404 connected to cathode 400, a screen grid 406 tied to plate 396, and a control grid 408 to which the input is applied. The output at plate 396 which is an amplified unidirectional voltage is applied to a cathode follower through a resistor 410.

The cathode follower comprises a plate 412 directly connected to positive potential source 100, a grid 413 connected to negative potential source 102 through a resistor 414 and a cathode 416 connected to the negative potential source 102 through a resistor 418 and a resistor 420. Cathode 416 is grounded through a diode 422 poled to prevent the cathode voltage from going positive. The automatic gain control voltage is taken from a voltage divider consisting of resistors 418 and 420 through an additional integrating network made up of series resistor 423 and capacitor 424 to ground.

Referring back now to the slope equalizer phase of the invention, the voltage appearing at the mid-point 31 of primary winding 32 of transformer 30 is applied to amplifier 42. Amplifier 42 comprises a first stage comprising a vacuum tube 430 which includes a cathode 432 connected to the negative potential source 102 through resistors 434 and 436, the junction therebetween being grounded through a capacitor 438, a control grid 440 returned to ground through a resistor 442, a screen grid 444 connected to positive potential source 100 through a resistor 446 and grounded through a capacitor 447, a suppressor grid 448 tied to cathode 432 and a plate 450 connected to source 100 through a voltage divider comprising resistors 452 and 454, the junction 457 therebetween being grounded through a capacitor 458. The output appearing at plate 450 is applied to the second stage of amplifier 42 through a capacitor 456.

The second stage of amplifier 42 comprises a pentode vacuum tube 460 which includes a plate 462 connected to junction 457 through a resistor 464, a cathode 466 connected to negative potential source 102 through a resistor 468, resistor 468 being bypassed to ground by a capacitor 474, a screen grid 470 tied to the screen grid 444 of tube 430, a suppressor grid 472 connected to cathode 466, and a control grid 476 which is returned to ground through a resistor 478. The output appearing at plate 462 is applied to the upper terminal of the primary winding 46 of transformer 44 through a capacitor 463, the lower terminal of primary winding 46 being connected to ground. The voltage developed across the secondary winding 48 of transformer 44 is applied as one input to amplitude sensitive phase detector 50, the other input being applied to the mid-point of secondary winding 48 from the junction of resistors 124 and 126 of oscillator 14 through a capacitor 148. With this arrangement there is compared in phase detector 50, the amplified sum of the signals of the oscillator frequency from mid-point 31 of winding 32 with the phase of the output of oscillator 14. Since phase detector 50 is chosen to be amplitude sensitive, the output polarity thereof depends upon which pilot signal is at a higher level and the amplitude of the output of phase detector 50 depends upon the difference in amplitude between the two pilot signals.

Phase detector 50 comprises a pair of conventional phase detectors. A first phase detector thereof comprises oppositely poled diodes 480 and 482 as shown shunted by a series arrangement of capacitors 484 and 486 and resistors 488 and 490 the junction of diodes 480 and 482, the junction of capacitors 484 and 486 and the junction of resistors 488 and 490 being connected together. Connected between the high side of capacitor 484 and the anode of diode 480 is a diode 492 having its cathode connected to the anode of diode 480 and its anode connected to the high side of capacitor 484. Connected between the junction of the anode of diode 482 and the low side of capacitor 486 is a diode 492 having its cathode connected to the anode of diode 482 and its anode connected to the low side of capacitor 486. The voltages appearing at the respective upper and lower terminals of secondary winding 50 are applied respectively to the cathodes of diodes 490 and 492 through capacitors 494 and 496.

To provide two phase detector outputs for controlling a slope equalizer, the second phase detector is provided which is similar to the first phase detector except that the input thereto is inverted and also includes oppositely poled diodes 498 and 500 shunted by capacitors 502 and 504 and resistors 506 and 508, the respective junctions of diodes 498 and 500, capacitors 502 and 504 and resistors 506 and 508 being connected. Series connected diodes 510 and 512 are provided as shown. The voltage from the upper terminal of secondary winding 50 is applied to the cathode of diode 512 through a capacitor 516 and the voltage from the lower terminal of secondary winding 50 is applied to the cathode of diode 510 through a capacitor 514. Resistors 490 and 508 are grounded through a common capacitor 518.

The output voltage of the first phase detector appearing across resistors 488 and 490 is applied through a resistor 489 as an input to a first slope equalizer cathode follower. The output of the second phase detector appearing across resistors 506 and 508 which is of the opposite polarity but equal in amplitude to the output of the first phase detector is applied through a resistor 507 as the input to a second slope equalizer cathode follower.

The first cathode follower comprises a vacuum tube 520. Tube 520 comprises a plate directly connected to the positive potential source 100, a grid 524 grounded through a capacitor 526 and a cathode 528 connected through a series arrangement of a potentiometer 530 and a resistor 532 to the negative potential source 102, the output from cathode follower tube 520 being taken at the junction of potentiometer 530 and resistor 532. Cathode 528 is also grounded through a diode 534 poled as shown. Tube 540 comprises a plate 542 directly connected to positive potential source 100, a control grid 544 connected to ground through a capacitor 546 and a cathode connected to negative potential source 102 through a series arrangement of a potentiometer 548 and a resistor 550, the output from tube 540 being taken at the junction of potentiometer 548 and resistor 550. Cathode 545 is also grounded through a diode 552 poled as shown. Potentiometers 548 and 530 serve the purpose of slope equalizer calibrating resistors. Control grids 544 and 524 are interconnected by a series arrangement of a resistor 560 and a capacitor 562. The respective opposite polarity but equal outputs of the cathode follower tubes are applied as inputs to the slope equalizer and in accordance with conventional circuit arrangements well known in the art serve to maintain a substantially flat output from the slope equalizer. It is appreciated, therefore, that the gain being required for the slope equalizer control, is independent of that used for the automatic gain control and is obtained at the frequency of oscillator 14 rather than with the utilization of a direct current voltage. The slope equalizer control is also independent of the unidirectional voltage established as the reference voltage for the automatic gain control.

While there have been shown particular embodiments of this invention, it will, of course, be understood that it is not wished to be limited thereto since different modifications may be made both in the circuit arrangements and the instrumentalities employed, and it is contemplated in the appended claims to cover any such modifications as fall within the true spirit and scope of the invention.

What is claimed as new and desired to secure by Letters Patent of the United States is:

1. In a receiver for receiving transmitted signals contained in a chosen band, said transmitted signals including a high pilot signal having the frequency of the upper end of said band and the low pilot signal having the frequency of the lower end of said band; means for automatically controlling the gain of said receiver comprising means for selecting said high pilot signal from said transmitted signals, means for selecting said low pilot signal from said transmitted signals, means responsive to the outputs of said high and low pilot signals selecting means for sampling said high pilot signal and low pilot signals in phase opposition and at a frequency substantially less than the frequency of said pilot signals, means responsive to the output of said sampling means for detecting said sampled high pilot signal, means responsive to the output of said sampling means for detecting said sampled low pilot signal, means for combining said detected signals in subtractive relationship, means responsive to the output of said signal combining means for deriving a reference voltage from said combined signals which is a chosen fraction of said combined signals, and means for deriving from said reference voltage a unidirectional voltage which is a function of said reference voltage for controlling the gain of said receiver.

2. In a receiver for receiving transmitted signals contained in a chosen band, said transmitted signals including a high pilot signal having the frequency of the upper end of said band and a low pilot signal having the frequency of the lower end of said band, said receiver containing slope equalizing means for said pilot signals; means for automatically controlling said slope equalizing means comprising means for selecting said high pilot signal from said transmitted signals, means for selecting said low pilot signal from said transmitted signals, means responsive to the outputs of said high and low pilot signals selecting means for sampling said high pilot and low pilot signals in phase opposition and at a frequency substantially less than the respective frequencies of said pilot signals, means responsive to the output of said sampling means for detecting said sampled high pilot signal, means responsive to the output of said sampling means for detecting said sampled low pilot signal, means for combining said detected signals in additive relation and means for comparing the signal resulting from said combination with the output from said sampling means to provide a pair of unidirectional voltages of equal amplitude but of opposite polarity for controlling said slope equalizing means.

3. In a receiver for receiving transmitted signals contained in a chosen band, said transmitted signals including a high pilot signal having the frequency of the upper end of said band and a low pilot signal having the frequency of the lower end of said band, said receiver including means for equalizing the slopes of said pilot signals; means for automatically controlling the gain of said receiver and for automatically controlling said slope equalizing means comprising means for selecting said high pilot signal from said transmitted signals, means for selecting said low pilot signal from said transmited signals, means responsive to the outputs of said selecting means for sampling said high pilot signal and low pilot signal in phase opposition and at a frequency substantially less than the frequency of said respective pilot signals, means responsive to the output of said sampling means for detecting said sampled high pilot signal, means responsive to the output of said sampling means for detecting said sampled low pilot signal, means responsive to the output of both of said detecting means for combining said detected signals in subtractive relationship, means responsive to the output of said combining means for deriving a reference voltage from said combined signals, said reference voltage being a chosen fraction of said combined signals, means for deriving from said reference voltage a unidirectional voltage which is a function of said reference voltage for controlling automatically the gain of said receiver, means responsive to the output of both of said detecting means for combining said detected signals in additive relationship, and means for comparing the signal resulting from said combination with the output of said sampling means to provide a pair of unidirectional voltages which are equal in amplitude but opposite in polarity for controlling said slope equalizing means.

4. In a receiver for receiving transmitted signals contained within a chosen band, said transmitted signals including a high pilot signal having the frequency of the upper end of said band and a low pilot signal having the frequency of the lower end of said band; means for automatically controlling the gain of said receiver comprising means for selecting said high pilot signal from said transmitted signals, means for selecting said low pilot signal from said transmitted signals, a source of waves having a frequency substantially less than the respective frequencies of said pilot signals, means for sampling said high pilot signal during wave alternations of one polarity, means for sampling said low pilot signal during wave alternations of the opposite polarity to provide thereby samples of said high and low pilot signal in phase opposition, means responsive to the output of said high pilot signal sampling means for detecting said high pilot signal sampled at said source frequency, means responsive to the output of said low pilot signal sampling means for detecting said low pilot signal sampled at said source frequency, means responsive to the output of said detection means for combining said detected signals in subtractive relationship, means for deriving from the signal resulting from said combination, a voltage which is a chosen fraction of said combined signal to provide a reference voltage, and means for deriving from said reference voltage a unidirectional voltage which is a function of the average of said reference voltage for controlling the gain of said receiver.

5. In a receiver for receiving transmitted signals contained in a chosen band, said transmitted signals including a high pilot signal having the frequency of the upper end of said band and a low pilot signal having the frequency of the lower end of said band, said receiver including means for equalizing the respective slopes of said pilot signals; means for automatically controlling said slope equalizing means comprising means for selecting said high pilot signal from said transmitted signals, means for selecting said low pilot signal from said transmitted signals, a source of waves having a frequency substantially less than the respective frequencies of said pilot signals, means for sampling said high pilot signal during wave alternations of one polarity to provide samples of said high pilot signal at said source frequency, means for sampling said low pilot signal during wave alternations of the opposite polarity to provide samples of said low and high pilot signals in phase opposition at said source frequency, means responsive to the outputs of said sampling means for combining in additive relationship said sampled high and low pilot signals, and means for comparing said combined sampled high and low pilot signals with the output from said source to provide a pair of unidirectional voltages of equal amplitude and opposite polarity to control said slope equalizing means.

6. In a receiver for receiving transmitted signals contained within a chosen band, said transmitted signals including a high pilot signal having the frequency of the upper end of said band and a low pilot signal having the frequency of the lower end of said band, said receiver including means for equalizing the respective slopes of said pilot signals; means for automatically controlling the gain of said receiver and for controlling said slope equalizing means comprising means for selecting said high pilot signal from said transmitted signals, means for selecting said low pilot signal from said transmitted signals, a source of waves having a frequency substantially less than the respective frequencies of said high and low pilot signals, means for transmitting said high pilot signal in response to alternations of one polarity of said signals from said source to provide samples of said high pilot signal at said source frequency and at one phase, means for transmitting said low pilot signal in response to alternations of the opposite polarity of the signals from said source to provide samples of said low pilot signal at said source frequency and at a phase opposite to said one phase, means responsive to the output of said high pilot signal sampling means for detecting said sampled high pilot signal, means responsive to the output of said low pilot signal sampling means for detecting said sampled low pilot signal, means for combining said detected signals in subtractive relationship, means responsive to the output of said combining means for deriving a reference voltage from said combined detected signals which is a chosen fraction of said combined detected signals and means for deriving from said reference voltage a unidirectional voltage which is a function of the average of said reference voltage for controlling the gain of said receiver, means for combining said detected signals in additive relationship, and means for comparing the signal resulting from said last-named combination with the output from said source to derive a pair of unidirectional voltages of equal amplitude but opposite polarity for controlling said slope equalizing means.

7. In a receiver as defined in claim 6 wherein said means for selecting said high pilot signal and said means for selecting said low pilot signal comprise narrow band pass high "Q" filters having respective center frequencies equal to the frequencies of said pilot signals.

8. In a receiver as defined in claim 7 wherein said filters comprise crystals having resonant frequencies at said center frequencies.

9. In a receiver as defined in claim 6 wherein said means for combining said detected signals in additive relationship comprise the primary winding and said means for combining said detected signals in subtractive relationship comprises the secondary winding of a transformer.

10. In a receiver as defined in claim 6 wherein said means for deriving said reference voltage comprises a full wave rectifier for rectifying said combined detected signals and means for developing said rectified voltage including a variable resistor for providing an output which is a fraction of said rectified voltage.

11. In a receiver as defined in claim 10 wherein said means for providing from said reference voltage a voltage which is a function of the average thereof comprises an integrating circuit to which said reference voltage is applied.

12. In a receiver as defined in claim 6 wherein said means for providing said pair of unidirectional voltages for controlling said slope equalizing means comprises an amplitude sensitive phase detector for producing two outputs having respected equal amplitudes and opposite polarities.

References Cited in the file of this patent

UNITED STATES PATENTS

| | | |
|---|---|---|
| 2,530,614 | Hugenholtz | Nov. 21, 1950 |
| 2,783,372 | Peterson et al. | Feb. 26, 1957 |

FOREIGN PATENTS

| | | |
|---|---|---|
| 881,216 | Germany | June 29, 1953 |